April 24, 1951 — F. J. PILIA — 2,550,495
GAS BLANKETED ARC WELDING
Filed Feb. 28, 1947 — 2 Sheets-Sheet 1
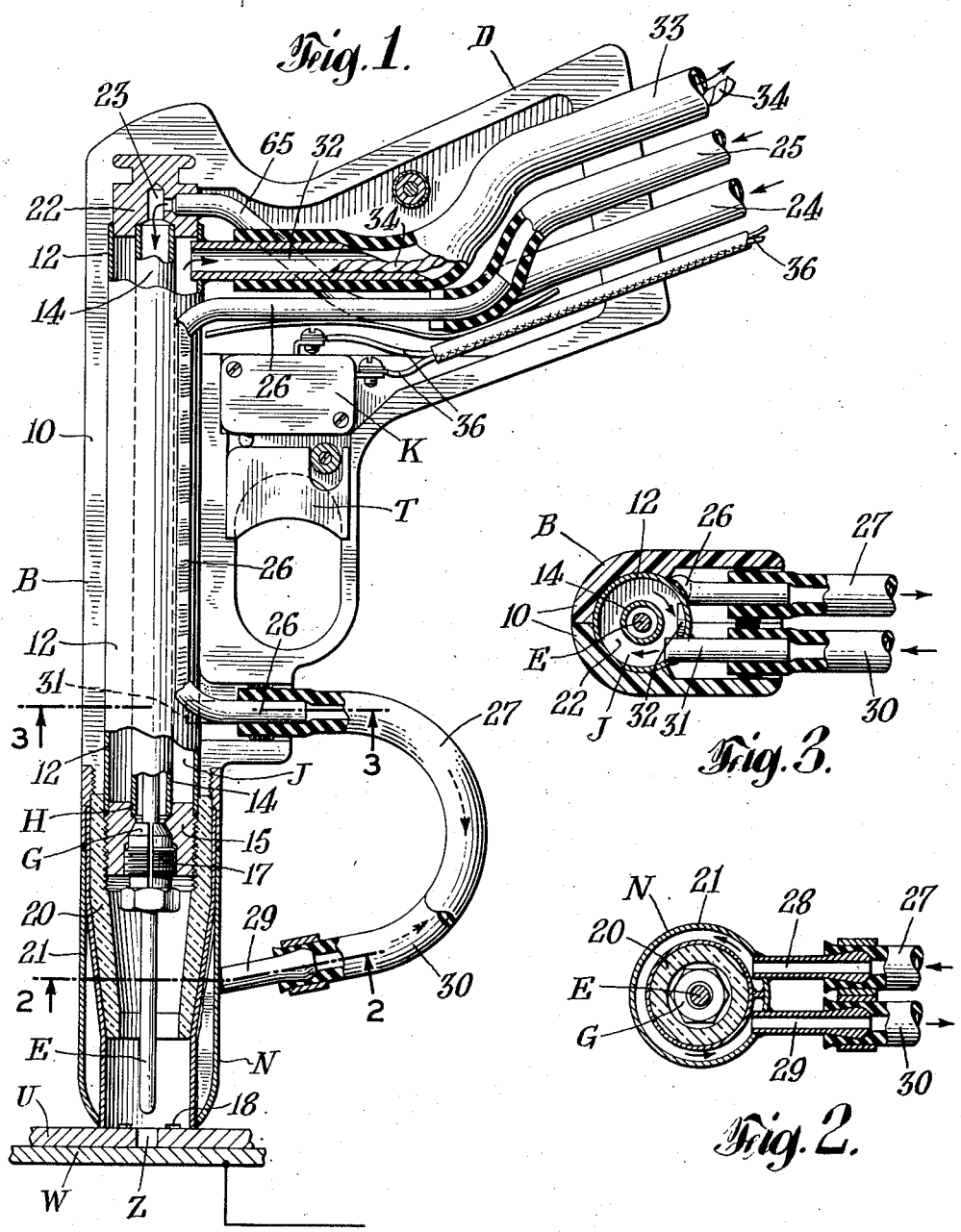
INVENTOR
FRANK J. PILIA
BY
ATTORNEY April 24, 1951          F. J. PILIA          2,550,495
GAS BLANKETED ARC WELDING
Filed Feb. 28, 1947          2 Sheets-Sheet 2
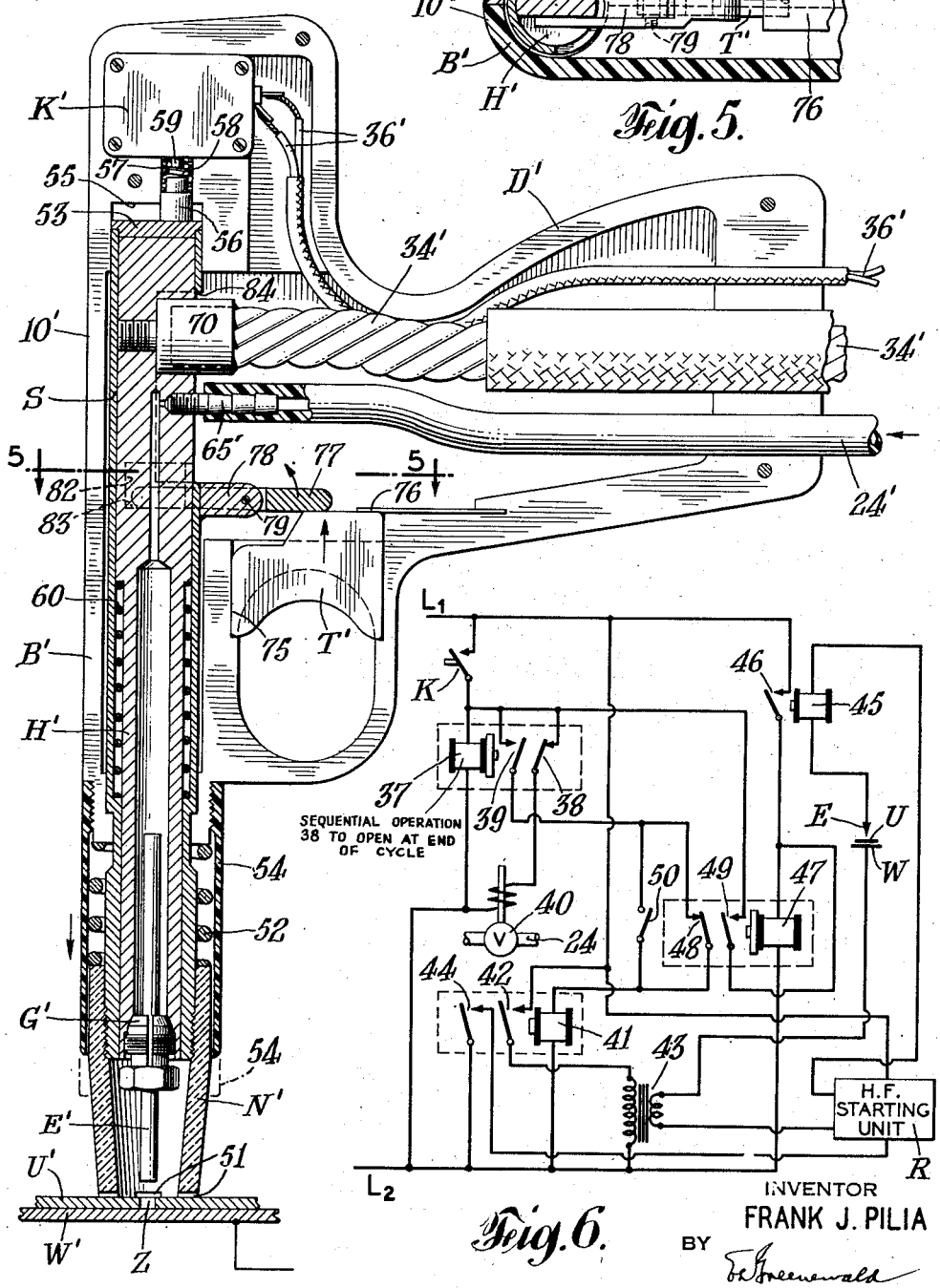
INVENTOR
FRANK J. PILIA
BY
ATTORNEY Patented Apr. 24, 1951

2,550,495

UNITED STATES PATENT OFFICE 2,550,495

GAS BLANKETED ARC WELDING

Frank J. Pilia, Springfield, N. J., assignor, by mesne assignments, to Union Carbide and Carbon Corporation, a corporation of New York Application February 28, 1947, Serial No. 731,577

7 Claims. (Cl. 219—8)

This relation relates to gas blanketed arc welding, and more particularly to method and apparatus of this character for making localized welds, e. g., a group of spaced-apart or spot welds uniting two metal sheets in superposed or face-to-face relation.

In gas blanketed arc welding as now practiced according to the procedure disclosed in Meredith Patent No. 2,342,086 for example, a non-consumable electrode is kept in continuous motion along a welding line, to produce a continuous seam or butt weld uniting two metal plates or sheets. In such seam welding, the end of the nozzle, which supplies inert gas to blanket the welding zone and the electrode, must be constantly spaced from the work for clearance as the nozzle and electrode are moved along the welding line. Also, inasmuch as continuity of the welded seam is essential, no provision is made for repetitive starting and stopping of the gas flow and the welding current.

In many fabricating operations it is desirable to permanently and economically unite metal members, such as sheets of aluminum, stainless steel, and the like in face-to-face or overlapping relation by localized or spot welds, as distinguished from uniting edges of such members by butt welds or by continuous welded seams.

The principal object of this invention is to provide procedure and equipment for utilizing a non-consumable electrode and a blanketing inert gas stream to expeditiously and economically produce localized or spot welds uniting superposed or overlapping metal members, particularly sheets of stainless steel, magnesium, aluminum and the like. Other important objects are to provide a spot welding method and apparatus wherein an inert gas is economically utilized to blanket both the welding zone and the adjoining non-consumable electrode while maintaining the latter in a stationary position at each welding point for the duration of the welding arc; wherein the nozzle for confining the discharging inert gas stream is utilized to engage and apply pressure against the work and to assist in positioning the electrode relatively to the welding point; and wherein the gas flow and the welding current are concurrently controlled so that they may be turned on and off repeatedly and rapidly at spaced welding points, in timed relation and automatically or in response to necessary manipulation of the apparatus, to quickly produce a succession of uniformly strong spot welds between superposed metal sheets.

Other objects and features of novelty will be apparent from the following description and the accompanying drawings, in which:

Fig. 1 is a vertical section through a welding gun according to, and for carrying out the method of, the present invention;

Fig. 2 is a transverse section taken along the line 2—2 of Fig. 1;

Fig. 3 is a transverse section taken along the line 3—3 of Fig. 1;

Fig. 4 is a vertical section through a modified form of welding gun;

Fig. 5 is a transverse section taken along the line 5—5 of Fig. 4; and

Fig. 6 is a wiring diagram of the circuit for turning on the inert gas and welding current in timed succession, applicable to both forms of the gun.

According to the present invention, metal is arc welded by directing an electrode toward a localized area of the metal, maintaining an annular zone of gas surrounding the electrode and extending over the localized area, striking an arc between the electrode and the area, maintaining the arc until the central portion of the area fuses, and maintaining the electrode and the axis of the annular zone of gas stationary relative to the localized area for the duration of the arc. In this process, only a single electrode is employed, which is preferably a substantially non-consumable electrode constructed of refractory metal such as tungsten or molybdenum, no filler metal is employed, no flux is required, and the spot weld is formed solely by the fusion and coalescence of the metal of the juxtaposed parts being welded. The gas is preferably inert, for example a noble monatomic gas such as argon or helium or mixtures thereof or with other gases.

When superposed sheets of metal are welded, the gas-shielded arc is struck between the electrode and a localized area of at least the nearer of the superposed sheets, the welding heat is conducted into the opposed localized area of the underlying sheet, the arc and gas flow are discontinued after the opposed molten portions fuse together, the electrode and its associated gas-confining nozzle are moved to another localized area laterally spaced from the first, and the operation is repeated to form another weld at the second localized area. Preferably the gas flows along the electrode and discharges through a non-current-carrying nozzle surrounding the electrode, the front end of the nozzle lies in a plane perpendicular to the axis of the electrode, thereby adapting the front end of the nozzle to be pressed into contact with the surface of a flat sheet of metal at numerous or all points surrounding the localized area, the electrode is spaced from the metal surface and held in a stable position perpendicular to the surface, and the arc is struck through the gas between the tip of the electrode and the metal. The flow of gas and the welding current are turned on and off in timed relation.

In the drawings, upper and lower sheets of metal U and W are shown in superposed relation with opposed surface portions thereof contacting one another. A hole Z may be drilled in the upper plate U with a diameter equal to the sheet thickness. The arc is struck between the upper sheet U and the tip of an electrode E. A nozzle N directs the stream of inert gas along the electrode E and over the arc and the welding zone.

The electrode E and nozzle N are carried by a torch or gun which comprises a barrel B provided with a handle D shaped as a pistol grip to facilitate aiming or other manipulation. Within the barrel B is mounted an electrode holder H, which receives the electrode E, and has an annular passage to conduct the inert gas therealong.

The electrode E is held in position by a clutch or gripping means G mounted in the front end of the electrode holder H, and constructed to form passages to conduct the inert gas from the interior of the electrode holder H to the interior of the nozzle N.

A trigger T is mounted adjacent the junction of the handle D and the barrel B, and actuates a switch K which energizes mechanism shown diagrammatically in Fig. 6 for turning on the flow of inert gas and welding current successively in timed relation.

After the gun has been positioned so that the nozzle N bears against the top or near sheet of metal, the trigger T is pulled to actuate the switch K and turn on the flow of blanketing gas, after which the welding current is automatically turned on to strike the arc.

In the form shown in Figs. 1, 2, and 3 the gun comprises a casing 10 of electrical and thermal insulating material which may be cut from impregnated fiber or molded of suitable plastic insulating material, generally formed in halves joined together longitudinally, forming the barrel B and handle D, and inclosing the working parts of the gun, including the electrode holder H and the switch K.

The barrel B has a liner comprising a metal tube 12, and the electrode holder H comprises a metal tube 14 concentric within the tube 12 and forming a gas conduit. The liner tube 12 is welded to the outer rim of a collar 15, and the gas tube 14 is welded to the inner rim thereof, to form therebetween a cooling water jacket J.

The gripping means or clutch G comprises a hollow threaded plug 17 screwed into the collar 15 forming the outer end of the electrode holder H, and slotted longitudinally to form tapered fingers for gripping the electrode E in adjusted position. The electrode E passes through the central bore of the plug 17, with its front end extending outwardly into the gas cup or nozzle N and its rear end extending inwardly into the bore of the electrode holder. The slots between the tapered fingers of the plug 17 form passages for inert gas from the bore of the electrode holder H and tube 14 to the interior of the gas cup or nozzle N.

The nozzle N comprises an inner electrically and thermally non-conductive ceramic cup 20 screwed onto the collar 15, and an outer metallic water jacket 21 screwed onto the barrel B and fitting and inclosing the cup 20. The front or work-engaging end of the water jacket 21 preferably is in a plane perpendicular to the axis of electrode E and is provided with vent openings or notches 18 to slowly vent the blanketing gas and thereby prevent the gas pressure from building up within the nozzle and blowing the fluid metal of the weld through the two sheets being welded.

The rear end of the barrel water jacket J is closed by a metal insert 22 welded to the respective tubes 12 and 14, and having a passage 23 leading from an inert gas supply hose 24 in the handle D through a nipple 65 to the interior of the gas tube 14 from which the gas passes through the slots in the split plug 17 to the interior of the cup 20.

Cooling water is supplied by an inlet hose 25 connected to a metal tube 26 soldered to the side of the liner tube 12. The front end of the metal tube 26 is connected by a flexible hose 27 to an inlet nipple 28 for the nozzle jacket 21. An outlet nipple 29 is connected by a flexible hose 30 to a nipple 31 leading to the barrel cooling jacket J. The rear end of the barrel jacket has welded thereto an outlet nipple 32 which is secured to the end of an outlet hose 33.

Passing through the outlet hose 33 is an electric cable 34 which is soldered to the outlet nipple 32, and supplies electric current through the water and the barrel jacket J to the gripping means G and thence to electrode E. The cable 34 is connected to any suitable source of electric welding current, and the switch K is connected by wires 36 to a timer 37 shown in Fig. 6. For convenience in manipulation, the gas supply tube 24, cooling water hoses 25 and 33, the welding current conductor 34, and the wires 36 from the switch K, all pass out through the bottom of the handle D.

As shown in Fig. 6, the timer 37 which is in series with the switch K is provided for controlling the supply of argon or other inert gas, and comprises a delayed action relay having normally closed contacts 38 and normally open contacts 39. The contacts 38 are in series with the coil of a solenoid valve 40 in the argon conduit 24. The contacts 39 are in series with the coil of a welding starter relay 41 having one set of normally open contacts 42 in series with the primary coil of a welding transformer 43, and another set of normally open contacts 44 in series with a high frequency starting unit R.

The welding circuit from the secondary coil of the welding transformer 43 includes the electrode E, the work U W, the high frequency starting unit R, and the coil of a welding current relay 45. This relay 45 has normally open contacts 46 in series with the coil of a weld timer 47, which comprises a delayed action relay having normally closed contacts 48 and normally open contacts 49. A cut-out switch 50 is shunted around the welding contacts 48, the two comprising a parallel circuit in series between the argon timer contacts 39 and the weld starter relay 41.

The switch K is normally open, and when closed by the trigger T, energizes the solenoid valve 40 through normally closed contacts 38 of the argon timer 37 to turn on the inert gas to the conduit 24. At the same time the switch K starts the timing period for the argon timer 37.

After a time interval sufficient for the argon flow to fill the nozzle N and blanket the weld area the argon timer 37 closes the contacts 39, which through closed contacts 48 of the weld timer 47 energizes the relay 41 to close the contacts 42 for the primary coil of the transformer 43 which induces the welding current. The welding current circuit includes the high frequency starting unit R, which establishes the arc and permits welding current to flow through the electrode E and plates U and W. Meanwhile, argon gas continues to envelop the tip of electrode E and to blanket the arc as well as the heated area on plate U.

When the welding current flows, it energizes the relay 45 to close the contacts 46, which energizes the welding timer 47 which times the duration of the weld. After the time interval the relay 47 opens contacts 48 to deenergize the relay 41, which opens contacts 42 and thereby deenergizes the welding transformer 43 and interrupts the flow of welding current.

At the same time, the welding timer 47 closes its contacts 49, keeping the timer from resetting and recycling. Argon continues to flow until the argon timer 37 opens the contacts 38 to deenergize the solenoid valve 40 which cuts off the gas flow in the conduit 24. When the operator releases the trigger T the switch K automatically opens which deenergizes and automatically resets the argon timer 37 for the next cycle.

The switch 50 may be employed to manually cut out the welding timer 47, in which event the duration of the weld is governed by the length of time the operator holds the switch K closed by pressure on the trigger T. The argon flow is automatically timed regardless of the position of the switch 50.

In the modified form of the invention shown in Figs. 4 and 5, the electrode E' is advanced through the nozzle N' to locate the weld and is thereafter retracted, the nozzle is pressed into contact with the metal, and the gas flow and welding current are turned on in timed relation to pressure of the nozzle on the work.

Longitudinally slidable within the barrel B' is a sleeve S which carries at its front end the nozzle N' of heat-resistant and electrically non-conductive material, and at its rear end the sleeve S carries means to engage the switch K'. The electrode holder H' is longitudinally slidably mounted within the sleeve S.

The trigger T' moves the electrode holder H' forward, which causes the clutch G' carried thereby to thrust the tip of the electrode E' out beyond the front end of the nozzle N'. In this projecting position the tip of the electrode functions as a finder for locating the spot at which the weld is to be made, after which the trigger T' is released and the electrode is automatically retracted to its welding position.

The sleeve S comprises a metal tube which extends out beyond the front end of the barrel B', and is threaded to receive the nozzle N', which is provided with vent notches 51. A coil compression spring 52 surrounds the sleeve S between the rear end of the nozzle N' and the front end of the barrel for urging forwardly the sleeve S and the nozzle carried thereby outwardly. The spring 52 is inclosed in a tubular electrical insulating cover 54 threaded onto the outer end of the barrel B' and slidably receiving the nozzle N'.

The rear end of the sleeve S is closed by a disk 53, which is adapted to engage the inner end wall 55 of the barrel B' as a stop to prevent the nozzle N' from retracting too far into the gun. The disk 53 is also adapted to engage and push a plunger 56 slidable in a bore 57 extending through the wall 55 and urged forwardly toward the disk 53 by a coil compression spring 58 engaging the casing of the switch K' and surrounding the actuating button 59 thereof.

The electrode holder H' is a metal plunger longitudinally slidable in the sleeve S, both having annular recesses which register to form a longitudinally expansible chamber receiving a coil compression spring 60 surrounding the electrode holder H' and urging it into retracted position. The rear end of the electrode holder H' receives welding current by means of a cable clamp 70 threaded into a lateral bore therein, and forming a terminal for the conductor 34'.

The trigger T' is slidably mounted in ways 75 in the casing 10, and is urged forwardly by a trigger return spring 76. The rear end of trigger T' engages the lower end of a lever 77, which is forked to receive a lug 78 depending from the sleeve S. The lever 77 is pivoted on the lug 78 by a pin 79, and the forked upper ends extend upwardly into a recess 82 in the electrode holder H'. The front wall of the recess forms a shoulder 83 against which the forked end of the lever 77 bears. The lower side of the sleeve S is slotted at 84 to clear the lever 77, nipple 65', and conductor 34'.

In operation, the gun illustrated in Figs. 4 and 5 is held over the workpiece with the nozzle N pointed toward the work and the trigger T' is squeezed. This pressure loads the trigger return spring 76 and turns the lever 77 on its pin 79, causing the lever to bear on the shoulder 83 and move the electrode holder H' forward. Forward movement of the electrode holder H' with the electrode clamp G' thereon thrusts the electrode E' out through the nozzle N'. In this projected position the electrode can be seen and thereby utilized as a finder for locating the spot to be welded.

The pressure on the trigger T' is now released as the gun is pressed downward, to permit the rim of nozzle N' to engage the upper surface of the top sheet to be welded. The relaxed pressure on the trigger T' permits the spring 60 to move the electrode holder H' inwardly until it abuts the disk 53.

Further downward pressure on the gun compresses the spring 52 and moves the sleeve S and disk 53 rearwardly, which moves the plunger 56 against the pressure of the spring 58 to engage the button 59 and actuate the switch K'.

The welding process hereinbefore described, in addition to the other metals mentioned, is applicable to a limited extent to the spot welding of mild steel sheets or plates, particularly those made of fully killed or deoxygenized mild steel. Another useful application is the spot welding of light sheet to heavy plate. In spot welding thin stainless steel sheet to heavy mild steel plate, there is no addition of filler metal and no dilution of the stainless character of the weld at the exposed surface of the stainless steel sheet, as occurs in the fushion-deposition of filler metal to produce a weld. In welding liners in pressure vessels the metal arc process heretofore employed adds metal which forms a bump that must be ground off. The poke welding process avoids this difficulty because it adds no metal.

While sheet-to-sheet or sheet-to-plate spot welding is the most important use of the present invention, it is not limited thereto, but includes circular channel to angle bar welding and many other irregular shapes. The improved spot welding appliance and procedure disclosed herein eliminates the need of the backing-up current-carrying contact or abutment commonly used in conventional electric resistance spot welding equipment. Thus, the simplicity and portability of the new welding gun and process are advantageous in performing the welding operation in inaccessible places, in any position, particularly overhead and at the job where large structures such as railroad cars, automobiles, or aircraft are assembled and fabricated.

What is claimed is:

1. Apparatus for arc welding metal, which comprises means for directing an electrode toward the metal, means for advancing a nozzle into contact with the metal to surround an area concentric with said electrode while spacing said electrode from the metal, a valve for turning on a supply of gas to said nozzle to fill the space between the electrode and said area, and a timer interconnected with said valve for turning on electric welding current to said electrode holder for automatically striking an arc between said electrode and said area at a predetermined time interval after said supply of gas has been turned on.

2. Apparatus for arc welding metal, comprising a gun having a barrel, an electrode holder in said barrel and including electrode gripping means, a nozzle carried by said holder and surrounding said gripping means and extending therebeyond to contact the metal to surround an area concentric with the electrode, a trigger mounted adjacent said barrel, a circuit closing device responsive to said trigger for turning on a supply of gas to said nozzle, and a delayed action circuit closing device responsive to said trigger for turning on a supply of electric welding current to said electrode holder.

3. Apparatus for fusion spot welding metal, comprising a barrel, an electrode holder in said barrel and including electrode gripping means, a nozzle carried by said holder and extending therebeyond to contact the metal to surround an area concentric with said electrode while spacing said electrode from the metal, an electrically operated valve for turning on a supply of gas to said nozzle to enter the space between the electrode and said area, a circuit closing device for controlling said valve, and a timer interconnected with said circuit closing device for turning on electric welding current to said electrode holder for automatically striking an arc between the electrode and said area at a predetermined time interval after said supply of gas has been turned on.

4. Semi-automatic apparatus for gas shielded electric arc welding with a bare electrode held in a portable hand gun to be held by the operator, comprising means for supplying an inert gaseous medium to shield the arc between the electrode and the workpiece, a source of welding current, means for advancing the bare electrode through said gaseous medium toward the work to strike the arc, relay means for controlling the supply of shielding gas to turn on such gas before the arc is struck and for controlling the connection of the electrode and workpiece to the source of welding current whereby the arc is struck after such gas is turned on, and a single pressure switch on said hand gun and connected to said relay means for energizing the same only while pressure is applied to said switch.

5. Semi-automatic apparatus for gas shielded electric arc welding with a bare electrode held in a portable hand gun to be held by the operator, comprising means for supplying an inert gaseous medium to shield the arc between the electrode and the workpiece, a source of welding current, means for advancing the bare electrode toward the work, a line switch for connecting the electrode and the workpiece to the source of welding current, a power relay for operating said line switch, a separate source of current for said power relay, a control relay, a source of low voltage current for said control relay, a manually operable switch on said hand gun connected to said low voltage source and to said control relay, and means whereby said control relay responds to operation of said manual switch to control the supply of the gaseous medium and the operation of said power relay to turn on such gas before the arc is struck and connect the workpiece to the source of welding current whereby the arc is struck after such gas is turned on.

6. Apparatus for gas shielded arc welding with a bare electrode guided and contacted by an electrode holder, comprising a gas directing nozzle carried by said holder, a conduit for supplying an inert gaseous medium to said nozzle to shield the arc between the electrode and the workpiece, means for advancing the electrode through said nozzle toward the workpiece to strike the arc, an electrically operated valve in said conduit for controlling the supply of gas to said nozzle, a welding circuit including the electrode in said holder and the workpiece and a source of welding current, relay means for controlling the operation of said valve and the supply of welding current to said circuit, and a single pressure switch on said electrode holder and connected to said relay means for controlling the supply of shielding gas to turn on such gas before the arc is struck and for controlling the connection of the electrode and workpiece to the source of welding current whereby the arc is struck after such gas is turned on.

7. Apparatus for gas shielded arc welding with a bare electrode guided and contacted by an electrode holder, comprising a gas directing nozzle carried by said holder, a conduit for supplying an inert gaseous medium to said nozzle to shield the arc between the electrode and the workpiece, means for advancing the electrode through said nozzle toward the workpiece to strike the arc, an electrically operated valve in said conduit for controlling the supply of gas to said nozzle, a welding circuit including the electrode in said holder and the workpiece and a source of welding current, a power relay for energizing said welding circuit, a control relay for energizing said gas control valve and for energizing said power relay, a manually operable switch on said electrode holder and connected to said control relay, and means whereby said control relay responds to the operation of said manual switch to control the supply of the gaseous medium and the operation of said power relay to turn on such gas before the arc is struck and connect the workpiece to the source of welding current whereby the arc is struck after such gas is turned on.

FRANK J. PILIA.

REFERENCES CITED

The following references are of record in the file of this patent:

UNITED STATES PATENTS

| Number | Name | Date |
|---|---|---|
| 363,320 | Bernardos et al. | May 17, 1887 |
| 1,359,620 | Ritchey et al. | Nov. 23, 1920 |
| 1,749,765 | Hendrickson | Mar. 11, 1930 |
| 1,869,328 | Tobey | July 26, 1932 |
| 1,967,728 | Taylor | July 24, 1934 |
| 2,019,027 | Stansbury | Oct. 29, 1935 |
| 2,093,821 | Southgate | Sept. 21, 1937 |
| 2,219,352 | Andrus | Oct. 29, 1940 |
| 2,274,631 | Meredith | Feb. 24, 1942 |
| 2,314,628 | Pavlecka | Mar. 23, 1943 |
| 2,315,502 | Crecca et al. | Apr. 6, 1943 |
| 2,360,160 | Pickhaver | Oct. 10, 1944 |
| 2,378,707 | Hiller | June 19, 1945 |